No. 851,567. PATENTED APR. 23, 1907.
E. SUTHERLAND.
DRYING COMB.
APPLICATION FILED DEC. 10, 1906.
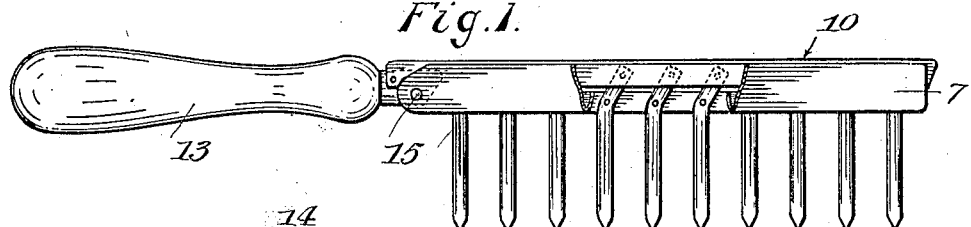
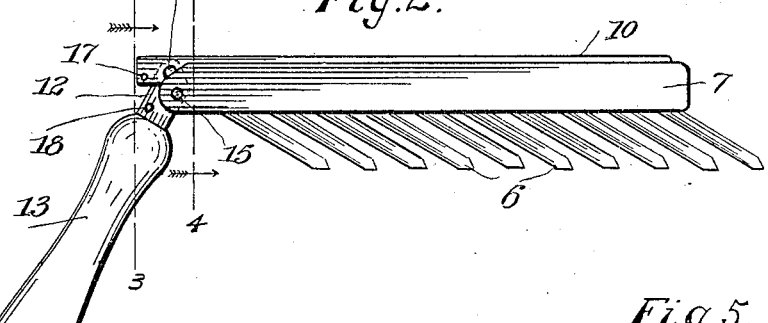
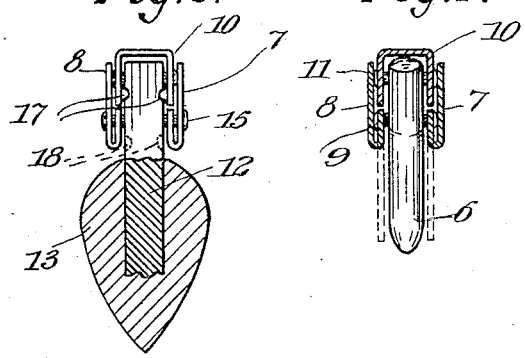
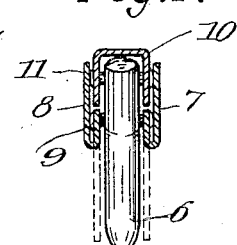
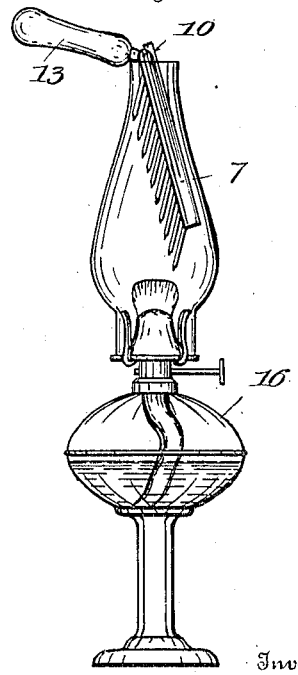
Witnesses
Inventor
Emil Sutherland
By Hazard & Harpham
Attorneys

UNITED STATES PATENT OFFICE.

EMIL SUTHERLAND, OF HOLLYWOOD, CALIFORNIA, ASSIGNOR OF ONE-HALF TO WILLIAM E. PILE, OF LOS ANGELES, CALIFORNIA.

DRYING-COMB.

No. 851,567.      Specification of Letters Patent.      Patented April 23, 1907.

Application filed December 10, 1906. Serial No. 347,189.

*To all whom it may concern:*

Be it known that I, EMIL SUTHERLAND, a citizen of the United States, residing at Hollywood, in the county of Los Angeles and State of California, have invented new and useful Improvements in Drying-Combs, of which the following is a specification.

My invention relates to a comb principally designed for drying ladies hair after it has been shampooed; and the object thereof is to produce a comb which can be heated by an ordinary kerosene lamp. I accomplish this object by the comb described herein and illustrated in the accompanying drawings in which:—

Figure 1—is a side elevation partly broken away of my improved drying comb. Fig. 2—is a side elevation showing the teeth collapsed. Fig. 3—is a section on line 3—3, and Fig. 4 is a section on line 4—4 of Fig. 2. Fig. 5—is a side elevation of a lamp and my comb in position to be heated thereby.

In the drawings 6 are the teeth of the comb. At a short distance from the upper end of the teeth they are pivotally secured to the metal side bars 7 and 8 by rivets 9. The upper end of the teeth are pivotally secured to the metal U-shaped top or back bar 10 by rivets 11. This top bar is pivotally secured to the metal shank 12 of the handle 13 by rivet 14. The side bars are straight flat pieces as shown partly in full and partly in dotted lines in Fig. 4 before they are united to the teeth by the rivets. After being secured to the teeth by the rivets they are bent upwardly so as to completely cover the heads of the rivets, and also the heads of the rivets which secure the U-shaped back bar to the top of the teeth, so as to prevent the hair from being caught on the rivets when the comb is used for drying the hair. The side bars are pivotally secured to shank 12 by rivet 15.

When the teeth are in the collapsed position shown in Fig. 2 the comb is in position to be inserted into the chimney of the lamp 16 as shown in Fig. 5. When in the collapsed position the rear end of the top bar projects rearwardly of shank 12 as shown in Fig. 2 and on the inner side and near the end thereof it is provided with inwardly projecting indentations or knobs 17, which, when the comb is in position for use as shown in Fig. 1, spring into depressions 18 in the sides of the shank and hold the comb reasonably rigid. The teeth, side and top bars are preferably made of aluminium as this metal presents a neat appearance, is very light and holds the heat very well.

By making the comb with collapsible teeth the comb can be passed into the end of the chimney. The upper ends of the teeth are preferably bent at an angle toward the front end of the comb as shown in Fig. 1, and the points of the teeth when collapsed are thrown forward or toward the front end of the comb, so that when placed within the chimney of the lamp they may be in the best position to receive the heat from the flame thereof. After being heated the comb is turned to the position shown in Fig. 1 and is used as an ordinary comb. The teeth are reheated as often as necessary.

Having described my invention what I claim is:—

1. A comb provided with a metallic back composed of side and top bars; metallic teeth pivotally secured to said top and side bars; and a handle secured to said top and side bars at different points at the rear end thereof.

2. A comb provided with a metallic back, composed of side and top bars; metallic teeth pivotally secured at the top to the top bar and below the top bar to the side bars; a handle secured to the top and side bars at different points; and means to hold the handle in a plane parallel with the plane of the top bar when desired.

3. A device of the class described, comprising a metallic channeled back; a plurality of metallic teeth pivotally secured to the flanges of said channeled back; metallic sides pivotally secured to said metallic teeth; a handle pivotally secured at different points to the channeled back and sides; and means to hold the handle in a plane parallel with the channeled back when desired.

4. A device of the class described, comprising a metallic channeled back; a plurality of metallic teeth pivotally secured to the flanges of said channeled back; metallic sides pivotally secured to said metallic teeth; and means pivotally secured to said back and sides, whereby the teeth may be forced into an open or collapsed position.

5. A comb provided with a top bar and two side bars; a plurality of teeth pivotally secured to the top and side bars; and means to prevent the collapse of said teeth when in their operative position.

6. A comb provided with a back composed of a plurality of members; a plurality of teeth pivotally secured to said members; means pivotally secured to said members, whereby the teeth may be forced into an operative or collapsed position; and means to prevent the collapse of said teeth when in their operative position.

7. A comb provided with a back composed of a plurality of members; a plurality of teeth pivotally secured to said members; means pivotally secured to said members, whereby the members may be moved in an opposite direction simultaneously; and means to hold said members rigidly when the teeth are in an operative position.

In witness that I claim the foregoing I have hereunto subscribed my name this 4th day of Dec, 1906.

EMIL SUTHERLAND.

Witnesses:
G. E. HARPHAM,
M. A. JONES.